(12) United States Patent
Abuelsaad et al.

(10) Patent No.: US 10,776,730 B2
(45) Date of Patent: *Sep. 15, 2020

(54) POLICY-BASED SCALING OF COMPUTING RESOURCES IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, Baltimore, MD (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,414

(22) Filed: Apr. 11, 2019

(65) Prior Publication Data

US 2019/0236506 A1 Aug. 1, 2019

Related U.S. Application Data

(63) Continuation of application No. 15/903,624, filed on Feb. 23, 2018, now Pat. No. 10,304,019, which is a
(Continued)

(51) Int. Cl.
*G06Q 10/06* (2012.01)
*G06F 9/50* (2006.01)
*H04L 12/911* (2013.01)

(52) U.S. Cl.
CPC ..... *G06Q 10/06315* (2013.01); *G06F 9/5072* (2013.01); *G06F 9/5077* (2013.01); *H04L 47/70* (2013.01)

(58) Field of Classification Search
CPC .............. H04L 41/5054; H04L 41/5006
See application file for complete search history.

(56) References Cited

U.S. PATENT DOCUMENTS 8,966,085 B2 2/2015 Abuelsaad et al.
9,940,595 B2 4/2018 Abuelsaad et al.
(Continued)

OTHER PUBLICATIONS

Gong, Z. et al., "PRESS: PRedictive Elastic ReSource Scaling for cloud systems", Proceedings of the 6th IEEE/IFIP International Conference on Network and Service Management (CNSM 2010), Oct. 2010, Niagara Falls, Canada, 8 pages.
(Continued)

*Primary Examiner* — Christopher C Harris
(74) *Attorney, Agent, or Firm* — William H. Hartwell; Maxine L. Barasch; Keohane & D'Alessandro, PLLC

(57) ABSTRACT

Embodiments of the present invention provide an approach for policy-driven (e.g., price-sensitive) scaling of computing resources in a networked computing environment (e.g., a cloud computing environment). In a typical embodiment, a workload request for a customer will be received and a set of computing resources available to process the workload request will be identified. It will then be determined whether the set of computing resources are sufficient to process the workload request. If the set of computing resources are under-allocated (or are over-allocated), a resource scaling policy may be accessed. The set of computing resources may then be scaled based on the resource scaling policy, so that the workload request can be efficiently processed while maintaining compliance with the resource scaling policy.

17 Claims, 7 Drawing Sheets

Related U.S. Application Data continuation of application No. 14/590,276, filed on Jan. 6, 2015, now Pat. No. 9,940,595, which is a continuation of application No. 13/343,293, filed on Jan. 4, 2012, now Pat. No. 8,966,085.

(56) References Cited

U.S. PATENT DOCUMENTS

| | | |
|---|---|---|
| 2010/0050172 A1 | 2/2010 | Ferris |
| 2010/0192157 A1 | 7/2010 | Jackson |
| 2010/0250748 A1 | 9/2010 | Sivasubramanian et al. |
| 2010/0332262 A1 | 12/2010 | Horvitz et al. |
| 2011/0078303 A1 | 3/2011 | Li et al. |
| 2011/0125894 A1 | 5/2011 | Anderson et al. |
| 2011/0138050 A1 | 6/2011 | Dawson et al. |
| 2011/0173626 A1 | 7/2011 | Chi et al. |
| 2011/0231899 A1 | 9/2011 | Pulier et al. |
| 2011/0264571 A1 | 10/2011 | Hadar et al. |
| 2011/0313902 A1 | 12/2011 | Liu et al. |
| 2012/0016721 A1 | 1/2012 | Weinman |
| 2012/0084113 A1 | 4/2012 | Brandwine et al. |
| 2012/0089726 A1 | 4/2012 | Doddavula |
| 2012/0131591 A1 | 5/2012 | Moorthi et al. |
| 2013/0041871 A1 | 2/2013 | Das et al. |
| 2013/0042008 A1 | 2/2013 | Das et al. |
| 2013/0060933 A1 | 3/2013 | Tung |
| 2013/0174168 A1 | 7/2013 | Abuelsaad et al. |
| 2015/0127410 A1 | 5/2015 | Abuelsaad et al. |
| 2018/0181896 A1 | 6/2018 | Abuelsaad et al. |

OTHER PUBLICATIONS

"Cloud Resource Auto-Scaling at Work", http://www.enki.co/blog/cloud-resource-auto-scaling-at-work.html_Blog, 2013, 4 pages.

WebSphere Software, "IBM Workload Deployer", Features and Benefits, http://www-01.ibm.com/software/webservers/workload-deployer/features/, Jan. 1, 2012, 4 pages.

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Published Oct. 2009, 13 pages.

Dougherty et al., "Model-driven Auto-Scaling of Green Cloud Computing Infrastructure", Institute for Software Integrated Systems, Vanderbilt University, Preprint submitted to Science of Computer Programming, Nov. 1, 2010, 15 pages.

Rightscale Inc., "Cloud Management, Why RightScale", http://www.rightscale.com/products/why-rightscale.php, copyright 2006-2012, 6 pages. no authors cited.

Harris, Christopher C., U.S. Appl. No. 13/343,293, Office Action dated Aug. 1, 2013, 16 pgs.

Ming Mao et al, "Cloud Auto-scaling with Deadline and Budget Constraints", 11th IEEE/ACM International Conference on Grid Computing, Copyright 2010, pp. 41-48.

Harris, Christopher C., U.S. Appl. No. 13/343,293, Final Office Action dated Feb. 21, 2014, 24 pgs.

Harris, Christopher C., U.S. Appl. No. 13/343,293, Notice of Allowance dated Oct. 9, 2014, 15 pgs.

Harris, Christopher C., U.S. Appl. No. 14/590,276, Office Action dated Dec. 31, 2015, 23 pgs.

Harris, Christopher C., U.S. Appl. No. 14/590,276, Final Office Action dated Jul. 12, 2016, 24 pgs.

Harris, Christopher C., U.S. Appl. No. 14/590,276, Office Action dated Apr. 6, 2017, 21 pgs.

Harris, Christopher C., U.S. Appl. No. 14/590,276, Final Office Action dated Oct. 11, 2017, 22 pgs.

Harris, Christopher C., U.S. Appl. No. 14/590,276, Notice of Allowance dated Nov. 28, 2017, 12 pgs.

Harris, Christopher C., U.S. Appl. No. 15/903,624, Office Action dated Jul. 27, 2018, 47 pgs.

Harris, Christopher C., U.S. Appl. No. 15/903,624, Notice of Allowance dated Jan. 15, 2019,, 17 pgs.

POLICY-BASED SCALING OF COMPUTING RESOURCES IN A NETWORKED COMPUTING ENVIRONMENT

RELATED U.S. APPLICATION DATA

This patent document is a continuation of, and claims the benefit of, co-pending and co-owned U.S. patent application Ser. No. 15/903,624, filed Feb. 23, 2018, which is a continuation of commonly owned U.S. patent application Ser. No. 14/590,276, filed Jan. 6, 2015, issued Apr. 10, 2018 as U.S. Pat. No. 9,940,595, which is a continuation of commonly owned U.S. patent application Ser. No. 13/343,293, filed Apr. 4, 2012, issued Feb. 24, 2015 as U.S. Pat. No. 8,966,085. The entire contents of each of such applications are herein incorporated by reference.

TECHNICAL FIELD

In general, embodiments of the present invention relate to computing resource scaling. Specifically, embodiments of the present invention relate to policy-based (e.g., price sensitive) scaling of computing resource in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud-based resources may be widely used to support and operate many different personal and/or business needs. Often, needs such as elasticity, high performance, and availability may be addressed by cloud solution providers offering a system to scale customer's resources as needed. Challenges may exist, however, in that current scalability functionality may either add or remove resources without considering customer-specific policies and/or constraints.

SUMMARY

In general, embodiments of the present invention provide an approach for policy-driven (e.g., price-sensitive) scaling of computing resources in a networked computing environment (e.g., a cloud computing environment). In a typical embodiment, a workload request for a customer will be received and a set of computing resources available to process the workload request will be identified. It will then be determined whether the set of computing resources are sufficient to process the workload request. If the set of computing resources is under-allocated (or is over-allocated), a resource scaling policy may be accessed. The set of computing resources may then be scaled based on the resource scaling policy, so that the workload request can be efficiently processed while maintaining compliance with the resource scaling policy.

A first aspect of the present invention provides a computer-implemented method for scaling computing resources in a networked computing environment, comprising: receiving a workload request in a computer memory medium for a customer; identifying a set of computing resources available in the network computing environment to process the workload request; detecting a need to scale the set of computing resources based on a comparison of the set of computing resources to a level of computing resources needed to process the workload request; accessing a resource scaling policy associated with the customer; identifying a set of pricing criteria in the resource scaling policy; and scaling the set of computing resources to process the workload request based on the need and the set of pricing criteria.

A second aspect of the present invention provides a system for scaling computing resources in a networked computing environment, comprising: a memory medium comprising instructions; a bus coupled to the memory medium; and a processor coupled to the bus that when executing the instructions causes the system to: receive a workload request in a computer memory medium for a customer; identify a set of computing resources available in the network computing environment to process the workload request; detect a need to scale the set of computing resources based on a comparison of the set of computing resources to a level of computing resources needed to process the workload request; access a resource scaling policy associated with the customer; identify a set of pricing criteria in the resource scaling policy; and scale the set of computing resources to process the workload request based on the need and the set of pricing criteria.

A third aspect of the present invention provides a computer program product for scaling computing resources in a networked computing environment, the computer program product comprising a computer readable storage media, and program instructions stored on the computer readable storage media, to: receive a workload request in a computer memory medium for a customer; identify a set of computing resources available in the network computing environment to process the workload request; detect a need to scale the set of computing resources based on a comparison of the set of computing resources to a level of computing resources needed to process the workload request; access a resource scaling policy associated with the customer; identify a set of pricing criteria in the resource scaling policy; and scale the set of computing resources to process the workload request based on the need and the set of pricing criteria.

A fourth aspect of the present invention provides a method for deploying a system for scaling computing resources in a networked computing environment, comprising: providing a computer infrastructure being operable to: receive a workload request in a computer memory medium for a customer; identify a set of computing resources available in the network computing environment to process the workload request; detect a need to scale the set of computing resources based on a comparison of the set of computing resources to a level of computing resources needed to process the workload request; access a resource scaling policy associated with the customer; identify a set of pricing criteria in the resource scaling policy; and scale the set of computing resources to process the workload request based on the need and the set of pricing criteria.

BRIEF DESCRIPTION OF THE DRAWINGS

These and other features of this invention will be more readily understood from the following detailed description of the various aspects of the invention taken in conjunction with the accompanying drawings in which.

Figure 1:
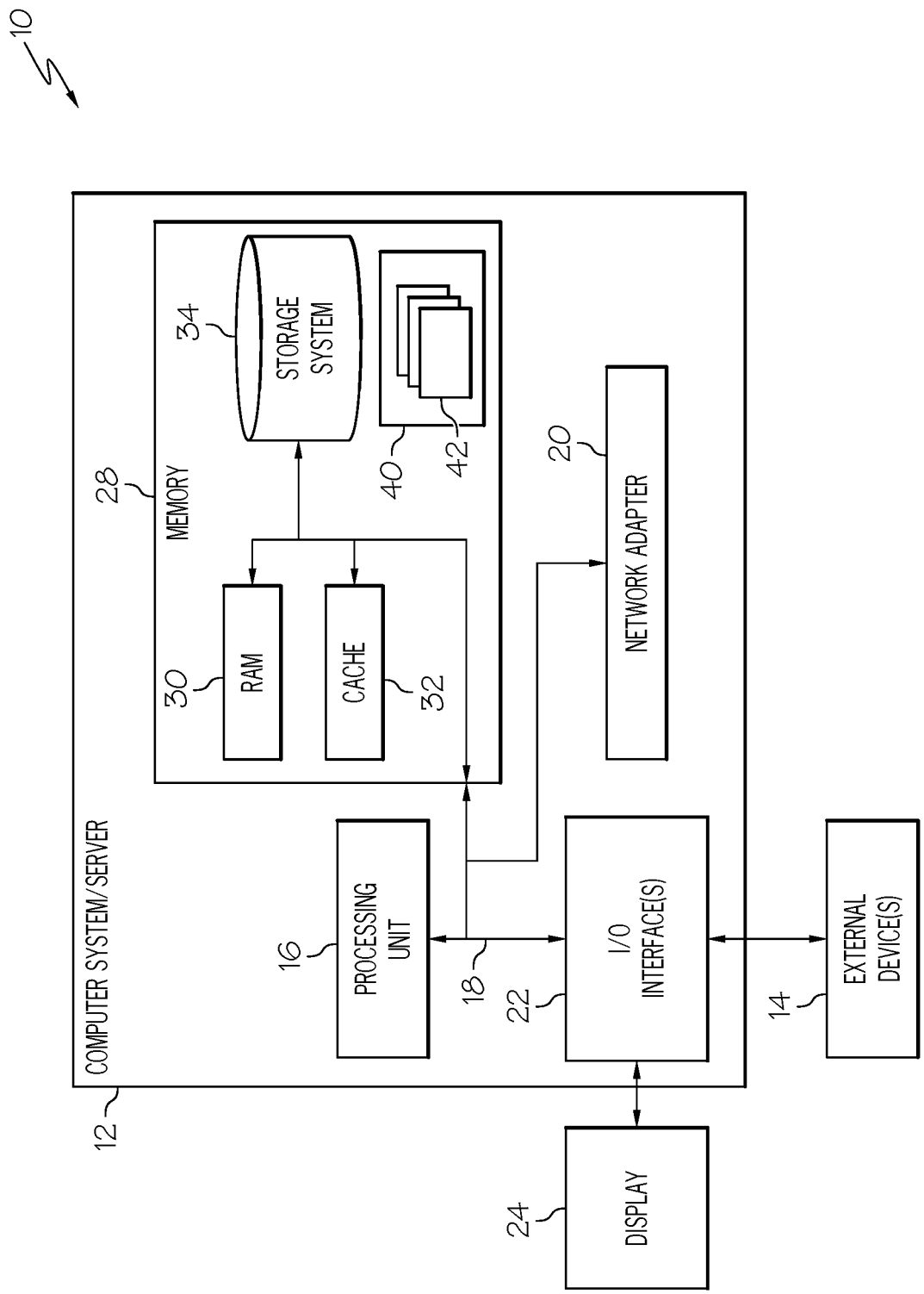
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for policy-driven (e.g., price-sensitive) scaling of computing resources in a networked computing environment (e.g., a cloud computing environment). In a typical embodiment, a workload request for a customer will be received and a set of computing resources available to process the workload request will be identified. It will then be determined whether the set of computing resources are sufficient to process the workload request. If the set of computing resources is under-allocated (or is over-allocated), a resource scaling policy may be accessed. The set of computing resources may then be scaled based on the resource scaling policy, so that the workload request can be efficiently processed while maintaining compliance with the resource scaling policy.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
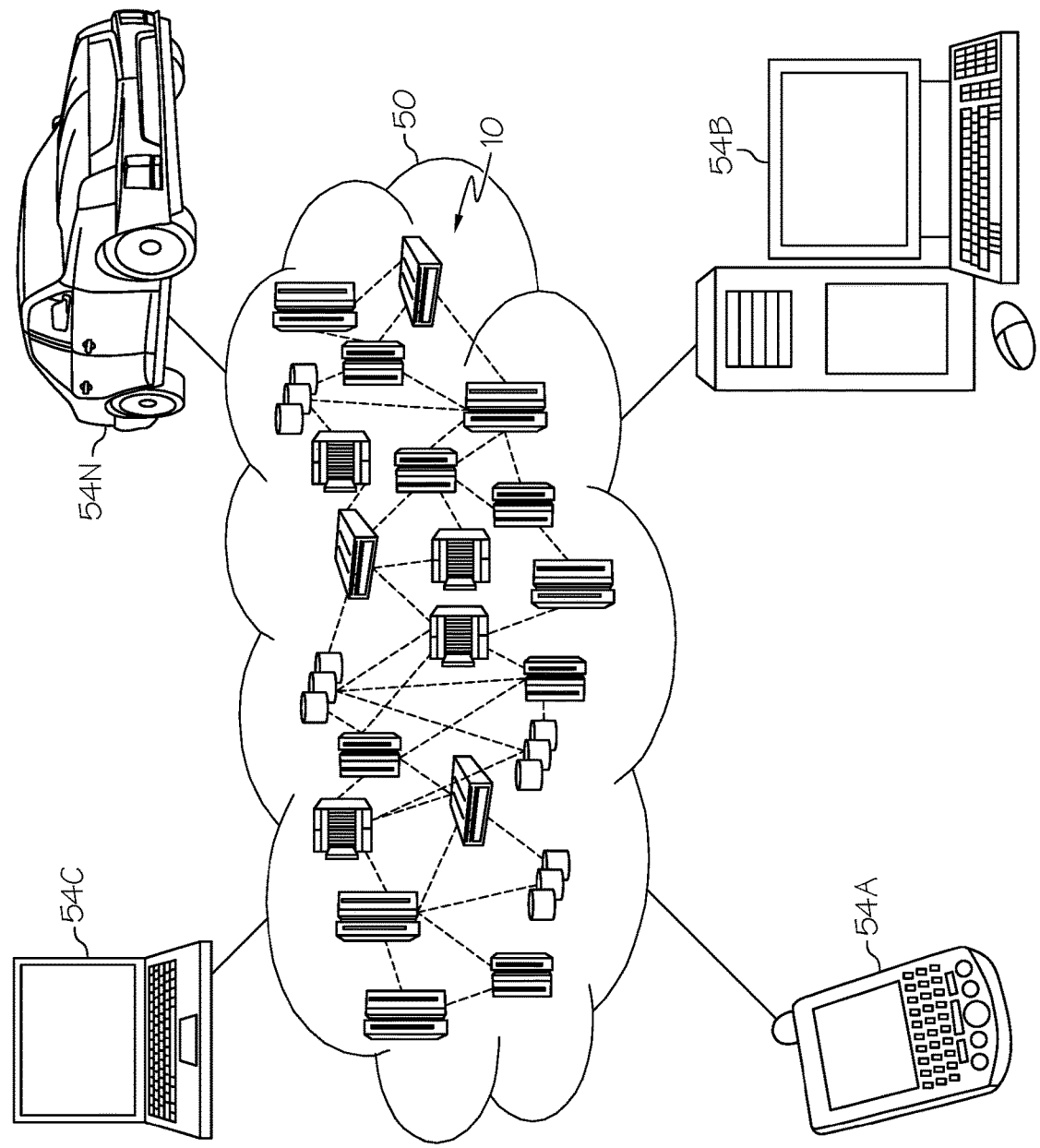
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
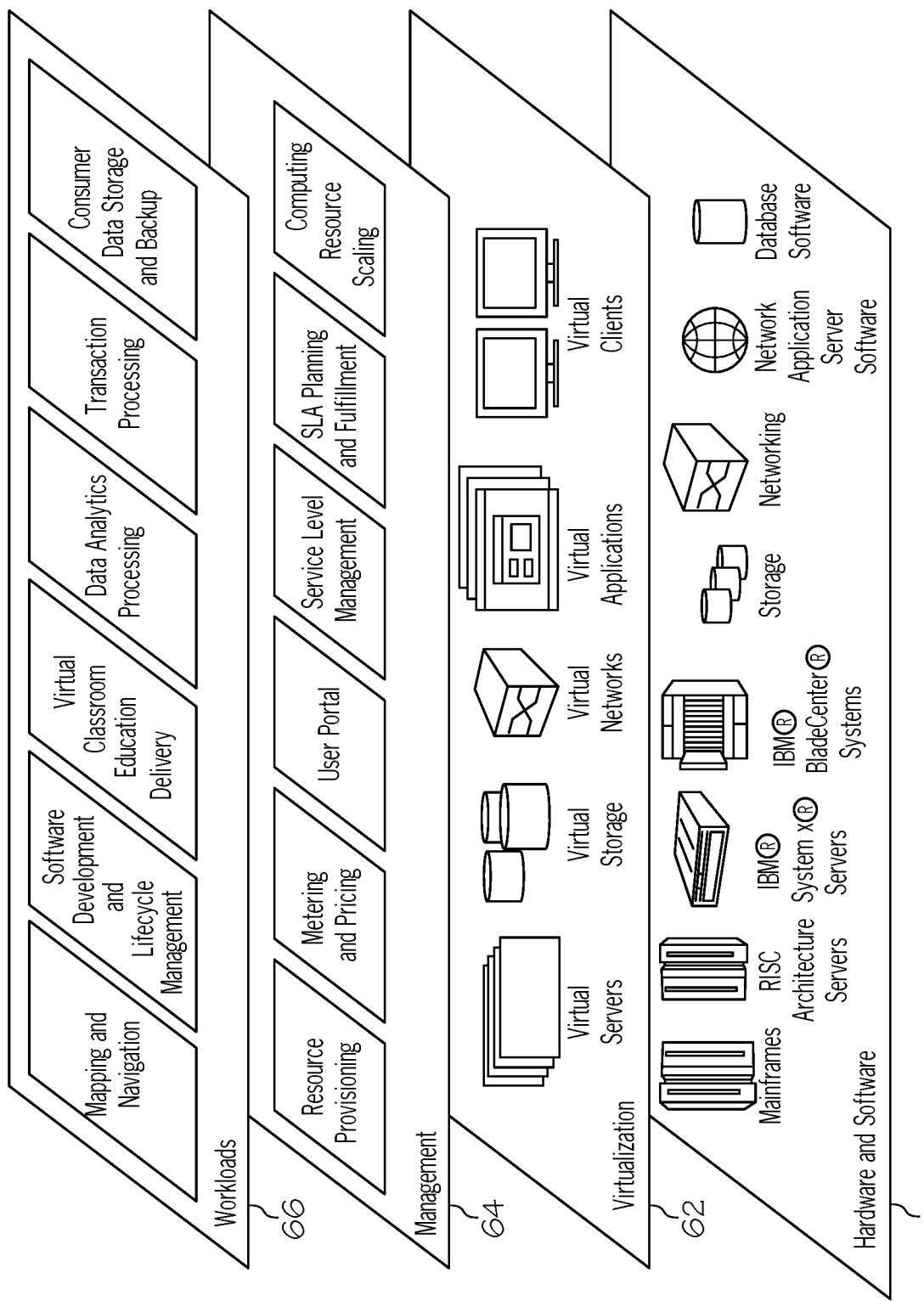
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computing resource scaling, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computing resource scaling functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
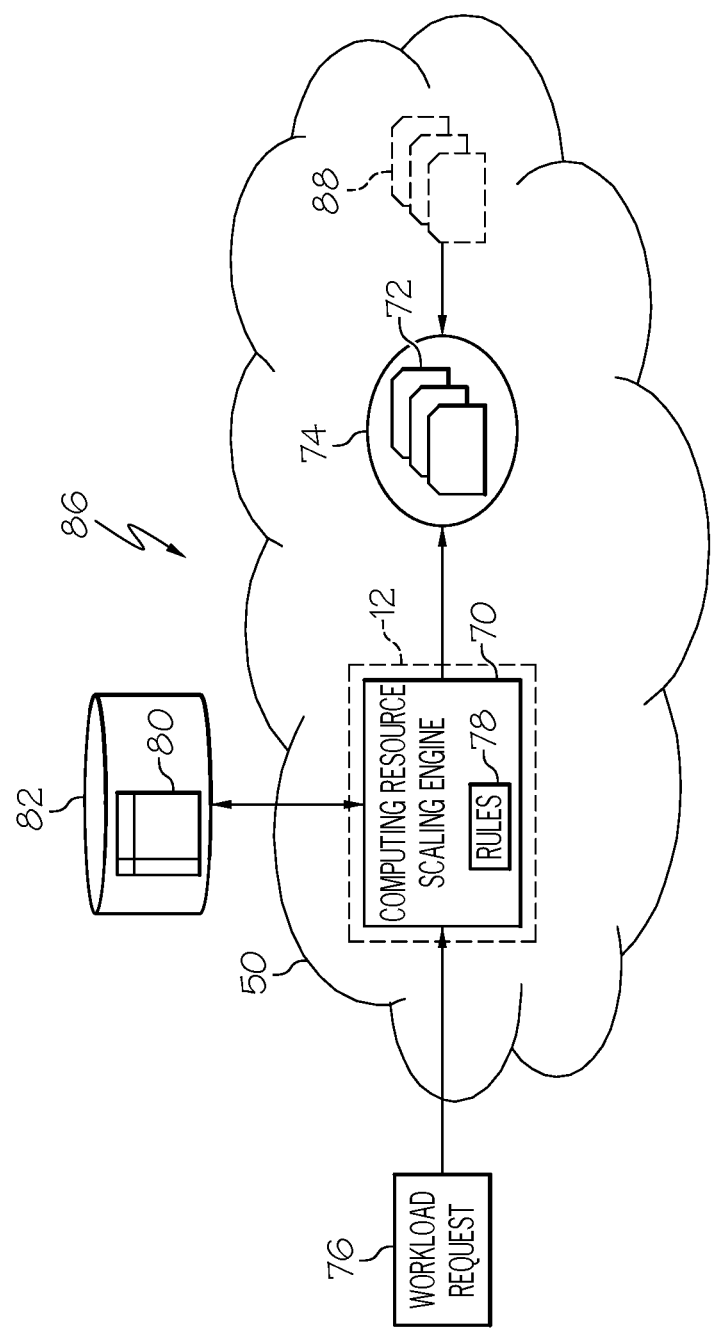
FIG. 4 depicts a system diagram according to an embodiment of the present invention.

Referring now to FIG. 4, a system diagram capable of implementing the functionality discussed herein according to an embodiment of the present invention is shown. It is understood that the teachings recited herein may be practiced within any type of networked computing environment 86 (e.g., a cloud computing environment 50). A stand-alone computer system 12 is shown in FIG. 4 for illustrative purposes only. In the event the teachings recited herein are practiced in a networked computing environment 86, each client need not have a computing resource scaling engine (engine 70). Rather, engine 70 could be loaded on a server or server-capable device that communicates (e.g., wirelessly) with the clients to provide device protection therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules 78 and/or provides confidence-based computing resource allocation hereunder.

Along these lines, engine 70 may perform multiple functions similar to a general-purpose computer. Specifically, among other functions, engine 70 may (among other things): receive a workload request 76 in a computer memory medium (e.g., 40 of FIG. 1) for a customer; identify a set of computing resources 72 (e.g., in a pool 74 of computing resources) available in the network computing environment 86 to process the workload request 76; detect a need to scale the set of computing resources based on a comparison of the set of computing resources to a level of computing resources needed to process the workload request (via engine 70 and rules 78 leveraging historical data or the like from storage device 82); access a resource scaling policy 80 associated with the customer; identify a set of pricing criteria in the resource scaling policy; scale (the set of computing resources 72 to process the workload request 76 based on the need and the set of pricing criteria; provision additional computing resources 88 to the set of computing resources 72 (e.g., add to pool 74) based on the need without exceeding the pricing constraint; de-provision computing resources from the set of computing resources to avoid exceeding the pricing constraint; and/or migrate data among the scaled set of computing resources.

Illustrative Example

Figure 5:
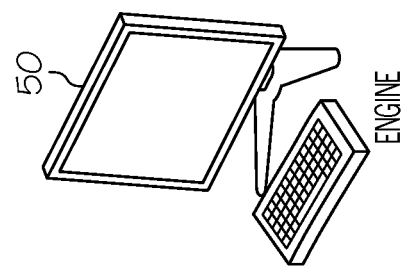
FIG. 5 depicts a diagram illustrating a computing resources scaling need according to an embodiment of the present invention.
Figure 5:
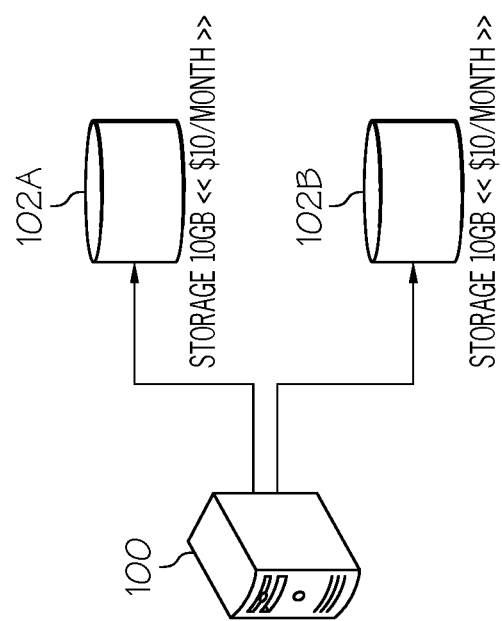

Referring to FIG. 5, an illustrative example of one possible way to implement the teachings recited herein is shown. As depicted, a workload processing unit 100 communicates with storage devices 102A-B. It is assumed that workload processing unit 100 has been asked to process a set of workload requests. Under one embodiment of the present invention, the environment is monitored by engine 50 as indicated above. As such, the process may proceed as follows:
1. Engine 70 monitors customers resources
   A. instances
   B. storage
   C. IP addresses
   D. etc.
2. Engine 70 detects a need to scale existing resources
   A. add resources
   B. remove resources
3. Engine 70 looks up a policy of scalability for the customer.
4. If the policy has pricing considerations, the system determines the best scaling approach.
   A. resource size
      1. x small=>y large (e.g., replace a number of small resources with a larger resource)
      2. y large=>x small (e.g., replace a single large resource with a number of small resources)
5. Engine 70 requests any new resource(s).
6. Engine 70 migrates existing data from the old resource(s) to the new resource(s).
7. Any old/unused resource(s) may be "cleaned up"
   A. de-provisioned
   B. stopped
   C. removed
8. Engine 70 continues to monitor resource(s) for scalability concerns.

Figure 6:
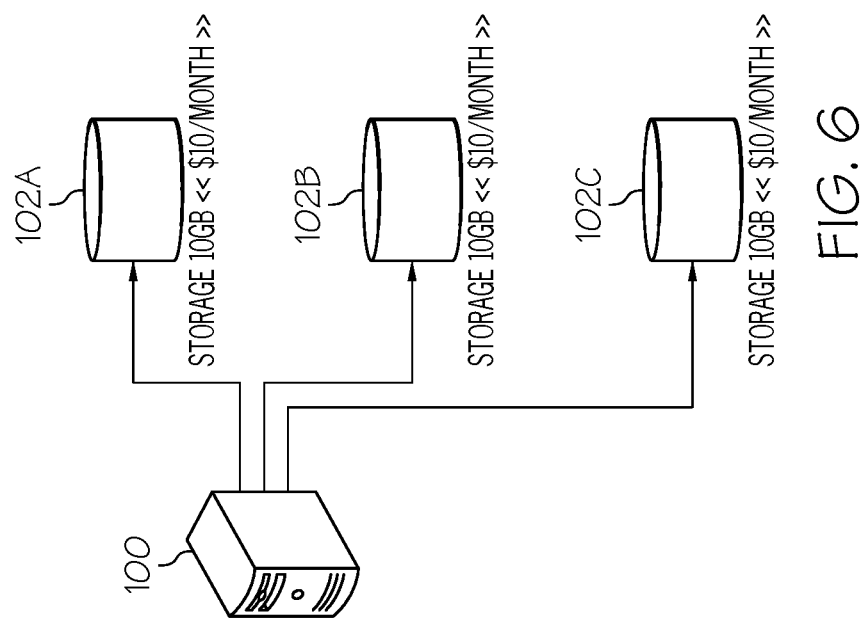
FIG. 6 depicts a computing resource scaling option according to an embodiment of the present invention.

FIG. 6 depicts one possible solution in the event that storage units 102A-B of FIG. 5 are insufficient to process an incoming workload request. For example, assume that 25 GB of total storage are needed to process the incoming workload request while maintaining previous operations. As depicted, engine 70 has provisioned an additional 10 GB storage unit 102C for an additional cost of $10.00/month.

Figure 7:
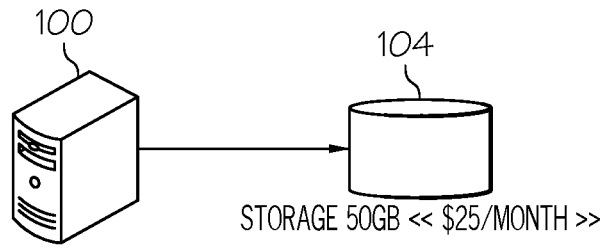
FIG. 7 depicts another computing resource scaling option according to an embodiment of the present invention.

However, assume that upon further analysis, engine 70 determines that the collective cost of $30.00/month for three storage units 102A-C will exceed a pricing constraint of $27.00/month set forth in the associated customer's resource scaling policy. In such an event, engine 70 will examine other options. One such option is shown in FIG. 7. As depicted, instead of adding an additional storage unit to a pool of storage units, engine 70 has determined that utilizing a single larger 50 GB storage unit 104 at $25.00/month will provide the needed storage space while not exceeding the pricing constraint.

Figure 8:
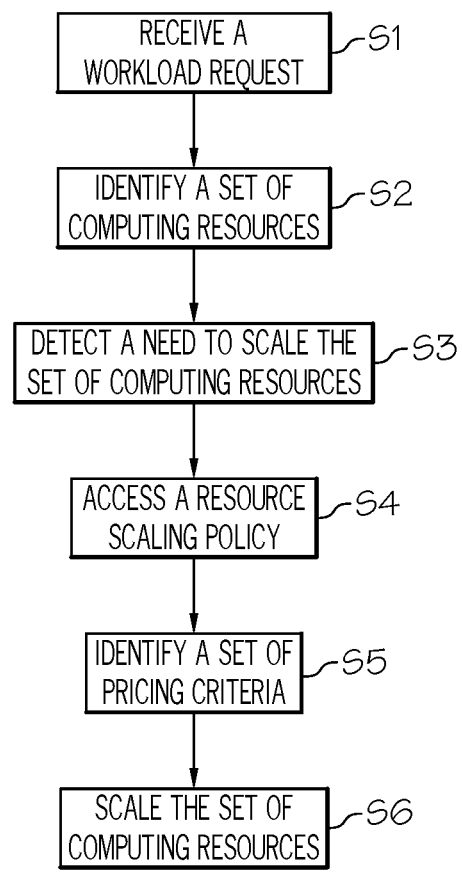
FIG. 8 depicts a method flow diagram according to an embodiment of the present invention.

Referring now to FIG. 8, a method flow diagram according to an embodiment of the present invention is shown. As depicted, in step S1, a workload request is received in a computer memory medium for a customer. In step S2, set of computing resources available in the network computing environment to process the workload request is identified. In step S3, a need to scale the set of computing resources is detected based on a comparison of the set of computing resources to a level of computing resources needed to process the workload request. In step S4, a resource scaling policy associated with the customer is received. In step S5, a set of pricing criteria is identified in the resource scaling policy. In step S6, the set of computing resources is scaled to process the workload request based on the need and the set of pricing criteria.

While shown and described herein as a computing resource scaling solution, it is understood that the invention further provides various alternative embodiments. For example, in one embodiment, the invention provides a computer-readable/useable medium that includes computer program code to enable a computer infrastructure to provide computing resource scaling functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computing resource scaling functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computing resource scaling. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for scaling computing resources in a networked computing environment, comprising:
    identifying a pool of computing resources available in the networked computing environment to process a workload request, wherein the pool of computer resources includes a pool of storage units;
    detecting a need to scale the pool of computing resources based on a comparison of the pool of computing resources to a level of computing resources needed to process a workload request;
    identifying a pricing constraint; and
    scaling the set of computing resources to process the workload request based on the level of computing resources needed and the pricing constraint, wherein the scaling comprises:
    determining that replacing the pool of storage units with a single storage unit larger than any of the storage units in the pool will not exceed the pricing constraint;
    de-provisioning the pool of storage units; and
    replacing the pool of storage units with the single storage unit larger than any of the storage units in the pool.

2. The computer-implemented method of claim 1, further comprising determining the level of computing resources needed to process the workload request.

3. The computer-implemented method of claim 1, further comprising receiving the workload request for a customer.

4. The computer-implemented method of claim 3, the scaling further comprising provisioning additional computing resources to the pool of computing resources based on the level of computing resources needed without exceeding the pricing constraint.

5. The computer-implemented method of claim 1, further comprising migrating data among the scaled set of computing resources.

6. The computer-implemented method of claim 1, the networked computing environment comprising a cloud computing environment.

7. The method of claim 1, wherein a service solution provider provides a computer infrastructure that performs the method for one or more consumers.

8. A system for scaling computing resources in a networked computing environment, comprising:
    a memory medium comprising instructions;
    a bus coupled to the memory medium; and
    a processor coupled to the bus that when executing the instructions causes the system to:
        identifying a pool of computing resources available in the networked computing environment to process a workload request, wherein the pool of computer resources includes a pool of storage units;
        detecting a need to scale the pool of computing resources based on a comparison of the pool of computing resources to a level of computing resources needed to process a workload request;
        identifying a pricing constraint; and
        scaling the set of computing resources to process the workload request based on the level of computing resources needed and the pricing constraint, wherein the scaling comprises:
        determining that replacing the pool of storage units with a single storage unit larger than any of the storage units in the pool will not exceed the pricing constraint;
        de-provisioning the pool of storage units; and
        replacing the pool of storage units with the single storage unit larger than any of the storage units in the pool.

9. The system of claim 8, the memory medium further comprising instructions for causing the system to determine the level of computing resources needed to process the workload request.

10. The system of claim 8, the memory medium further comprising instructions for receiving the workload request for a customer.

11. The system of claim 10, the memory medium further comprising instructions for causing the system to provision additional computing resources to the pool of computing resources based on the level of computing resources needed without exceeding the pricing constraint.

12. The system of claim 8, the memory medium further comprising instructions for causing the system to migrate data among the scaled set of computing resources.

13. The system of claim 8, the networked computing environment comprising a cloud computing environment.

14. A computer program product for scaling computing resources in a networked computing environment, the computer program product comprising a computer readable hardware storage device and program instructions stored on the computer readable storage media, to:
 identifying a pool of computing resources available in the networked computing environment to process a workload request, wherein the pool of computer resources includes a pool of storage units;
 detecting a need to scale the pool of computing resources based on a comparison of the pool of computing resources to a level of computing resources needed to process a workload request;
 identifying a pricing constraint; and
 scaling the set of computing resources to process the workload request based on the level of computing resources needed and the pricing constraint, wherein the scaling comprises:
 determining that replacing the pool of storage units with a single storage unit larger than any of the storage units in the pool will not exceed the pricing constraint;
 de-provisioning the pool of storage units; and
 replacing the pool of storage units with the single storage unit larger than any of the storage units in the pool.

15. The computer program product of claim 14, the computer readable hardware storage device further comprising instructions to determine the level of computing resources needed to process the workload request.

16. The computer program product of claim 14, the computer readable hardware storage device further comprising instructions to receive the workload request for a customer.

17. The computer program product of claim 14, the computer readable hardware storage device further comprising instructions to migrate data among the scaled set of computing resources.

* * * * *